United States Patent

[11] 3,632,999

[72] Inventors Charles F. Strandberg, Jr.;
Robert C. Strandberg, both of Greensboro, N.C.
[21] Appl. No. 2,693
[22] Filed Jan. 14, 1970
[45] Patented Jan. 4, 1972
[73] Assignee Strandberg Engineering Laboratories Inc.
Greensboro, N.C.

[54] COST ACCUMULATOR AND METHOD FOR COST ACCUMULATING
11 Claims, 5 Drawing Figs.
[52] U.S. Cl. .................................................... 235/92 PD,
235/92 R, 235/92 CP, 235/92 FQ
[51] Int. Cl. .................................................... G07c 3/10
[50] Field of Search .......................................... 235/92, 8,
21, 24, 27, 29 F, 37; 328/66; 307/252.25, 283,
301, 271; 331/111, 177

[56] References Cited
UNITED STATES PATENTS
3,075,698  1/1963  Fletcher ........................ 235/92
3,510,803  5/1970  Jacobson et al. ............. 328/66 X
3,210,686  10/1965 Rocca ........................... 331/111 X
3,233,197  2/1966  Deichen ........................ 331/177 X
3,439,282  4/1969  Hiro Moriyasu .............. 307/271 X
2,828,468  3/1958  Ball et al. ..................... 235/92 (29 F)

Primary Examiner—Maynard R. Wilbur
Assistant Examiner—Joseph M. Thesz, Jr.
Attorneys—Munson H. Lane and Munson H. Lane, Jr.

ABSTRACT: A device to compute and totalize hourly pay rates times on-job time for any number of hourly paid workers with differing hourly rates, having means to display the resultant total (total dollar cost to the nearest cent) on a digital counter. The device comprising a resistance-controlled electronic oscillator whose output frequency may be varied by plugging into the frequency-determining circuit of the oscillator resistances in parallel, whose values are selected in relationship with the hourly pay rates of individual workers so that the oscillator frequency will be proportional to the combined hourly pay rates for all the workers on the job and integrating means for integrating the combined hourly pay rates with time.

INVENTORS
Robert C. Strandberg &
Charles F. Strandberg, Jr.

BY Munson H. Lane
ATTORNEY

INVENTORS
Robert C. Strandberg &
Charles F. Strandberg, Jr.

BY Munson H. Kane
ATTORNEY

COST ACCUMULATOR AND METHOD FOR COST ACCUMULATING

The invention relates to a new and improved cost accumulator which computes and totalizes hourly pay rates times on-job time for any number of hourly paid workers with differing hourly rates, and displays the resultant total.

In various operations wherein one or more employees with differing hourly pay rates are involved on a particular job, the cost of which must be accurately determined over the time required to complete the job, the process of accounting becomes complex and costly.

It is therefore an object of this invention to provide a new and improved electronic cost accumulator which computes the total labor cost of a job simply and accurately without involving the labor of an accountant's constant supervision.

In the prior art various mechanical devices have been used to compute labor costs on a job basis, but these are relatively complex, bulky, and costly.

In contrast thereto this invention is an assembly of electronic and electrical components which is accurate, small in size, simple to operate, and relatively inexpensive to manufacture and maintain.

It is an object of this invention to provide a cost accumulator including an electronic oscillator whose frequency is accurately controlled by inserting a rate-programmed resistance plug for each worker working on a job into the frequency-determining circuit of the oscillator so that the output frequency of the oscillator will be proportional to the combined pay rates for the workers on the job, an integrating device for integrating the combined pay rates with time, and visual means for displaying the resultant total (total dollar cost to the nearest cent).

It is a further object of the invention to provide each worker on the job with a resistor plug which is accurately related to the worker's pay rate and which will be plugged into the cost accumulator when the worker is on the job and which will be unplugged when the worker leaves the job.

It is a further object of the invention to provide a cost accumulator having a digital counter display means.

It is a further object of the invention to provide the cost accumulator of this invention with a programmable unijunction transistor relaxation oscillator.

With the foregoing objects and features in view and such other objects and features as may become apparent as this specification proceeds, the invention will be understood from the following description taken in conjunction with the accompanying drawings wherein like characters of reference used to designate like parts and wherein.

Figure 5:
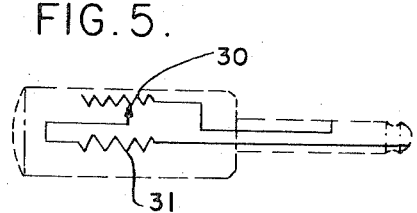

FIG. 5 is a schematic circuit diagram of one of the rate programmed plugs. Referring now to the drawings in detail and particularly to FIG. 1, the cost accumulator is designated generally by the reference numeral 10. It comprises a power supply 11, a resistance-controlled oscillator 12, a pulse-stretching network preferably a monostable multivibrator 13, and a counter-driving network 14 which drives the inductive coil of an electromechanical digital counter K1.

The full-wave rectifier power supply 11 derives power through a grounded three-prong plug 15 connected to a 90–140 volt alternating current source, and includes a manual on-off switch S3 and a safety fuse F1 in the primary side of a power supply transformer T1. The secondary side of the transformer T1 includes a grounded center tap and rectifying diodes X3 and X4 connected to opposite sides of the secondary winding. Unregulated voltage is provided to the counter and driver transistors Q5 and Q6 by capacitor C4, diodes X3 and X4, and transformer T1. The zener diode X1, capacitor C3 and ballast resistor R14 provide regulated voltage for the oscillator 12 and multivibrator 13 and are included mainly for better accuracy for wide excursions in line voltage.

In the oscillator 12, J1 through JN represent the jacks for connection to rate-programmed plugs.

Capacitor C1, transistor Q1, resistors R1 and R2 comprise the basic oscillator 12. Resistors R4, R5, and R6 provide means of varying the intrinsic standoff ratio of Q1, thereby providing initial calibration means. The output from the oscillator 12 is fed via resistor R3 to the input of the monostable multivibrator 13 comprised of capacitor C2, transistors Q2 and Q3 and resistors R7, R8, R9, and R10. This multivibrator is required to "stretch" the narrow width pulse from the oscillator 12 (approx. 1 to 2 milliseconds) to about 100 milliseconds to ensure reliable operation of the electromechanical counter, K1. The pulse width or period of the multivibrator is approximately equal to 0.6 times C2 times R9. Output from the multivibrator is fed via resistor R13 to the base of transistor Q5 whose output drives the base of transistor Q6, operating as a power emitter-follower. Diode X2 provides a return path for the circulating current in the inductive coil K1 when transistor Q6 turns off. In addition to providing base drive to transistor Q5, the multivibrator also drives the base of transistor Q4, via resistor R11. R12 keeps the impedance low at the base of transistor Q4 when transistor Q3 turns off. Q4 is included to ensure that C1 is completely discharged each time Q1 fires. For clarification, operation of this part of the circuit is as follows: Assuming that initially no rate-programmed plug is connected at any of the jacks, C1 is fully discharged, and Q1 is off. Therefore, with no voltage across R2, Q2 is off and C2 is charged fully positive on its plug side via R7 and the base-emitter junction of Q3. Q3 is turned on and is held on via R9. With Q3 on and hence with no voltage from its collector to ground, Q4 is off and its collector presents a very high impedance to the anode (A) of Q1 and to the plus side of C1. If, now, a plug is connected at one of the jacks, C1 begins to be charged through the resistance of the rate-programmed plug and through R1. When the voltage across C1 reaches the firing voltage of Q1, Q1 switches on, thereby effectively "dumping" the charge on C1 through R2, producing a positive pulse at the junction of R2 and R3. This, in turn, causes Q2 to switch on, and its collector potential drops to nearly ground. The plus side of C2, previously charged fully positive, is now at ground potential. With its base reverse biased (negative with respect to its emitter), Q3 turns off, and its collector goes positive. This provides base turn-on signal to Q2 via R8, and effectively holds Q2 on even after completion of the oscillator pulse across R2. As the collector of Q3 went positive, both Q4 and Q5 were turned on, the latter providing base drive to the base of the counter driver transistor, Q6. As Q4 turned on, with its collector dropping nearly to ground potential, C1 is fully discharged through this low impedance. Previously, when Q1 turned on, C1 was nearly discharged but the impedance of Q1 and R2 was sufficiently high that if the resistance of the rate-programmed plug had been fairly low, approximately 5,000 ohms or lower, C1 would have been continuously charged with Q1 on, resulting in a possible lockup of Q1 and cessation of oscillation. However, the inclusion of Q4 eliminates this possible problem and ensures complete discharge of C1. Returning to the point where Q3 was turned off due to its base being reverse biased, C2 now begins to be charged via R9. When the voltage on the base of Q3 finally reaches approximately +0.7 volts, Q3 turns on, thereby removing the base drive signal to Q2 vis R8 and Q2 turns off. C2 once again charges through R7 and the base-emitter junction of Q3. Q4, Q5, and Q6 all turn off and the circuit is now ready for a new cycle. In completing the discussion of the circuit, the resistor R1 is included merely as a protective measure to protect Q4 in the event of a shorted rate-programmed plug.

Figure 2:
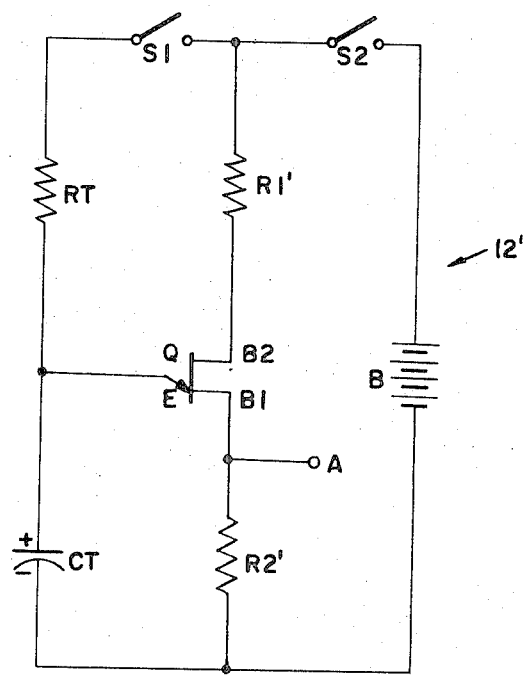
FIG. 2 is a schematic diagram of a simple unijunction transistor relaxation oscillator illustrated for the purpose of explaining the principal of the invention.

The theory of operation of the invention will be explained with reference to FIG. 2 which shows a unijunction transistor relaxation oscillator circuit 12' which is essentially the equivalent of the oscillator 12 shown in FIG. 1 with the exception that the transistor Q1 of oscillator 12 is a relatively new type of unijunction transistor called a programmable unijunction transistor or PUT, whereas the transistor Q of FIG. 2 is an older standard type unijunction transistor. The main advantage of using the PUT is its programmable feature, that is, the ability to control the intrinsic standoff ratio $\eta$, thereby permitting extremely accurate calibration of timers and oscillators. This can be accomplished without any adverse effects on the normal operation of the device or upon dependent circuitry. Otherwise the operation of the PUT, Q1, is comparable to that of the older standard unijunction transistor Q.

The single unijunction transistor relaxation oscillator 12' shown in FIG. 2 comprises the unijunction transistor Q having emitter E, and bases B1 and B2, power supply B with resistor R1', switch S2, power supply B and resistor R2' connected in series between base B2 and base B1 of the transistor Q: resistor R1', switch S1 and resistor RT connected in series circuit between emitter E and base B2 of the transistor; and resistor R2' and capacitor CT connected between emitter E and base B1 of the transistor. An output terminal A is connected to base B1 of the transistor Q. The resistor RT represents a single programmed resistor plug whose resistance is proportional to the hourly pay rate of an individual worker. In actual practice one or more programmed resistor plugs will be connected in the oscillator timing circuit depending on how many workers are working on a job at any one time. However for simplicity of explanation the resistor RT is shown to represent a single worker's programmed resistor plug. With switch S1 open and switch S2 closed, no output pulses appear at A. When S1 is closed, capacitor CT is charged through resistor RT. When the voltage across CT reaches the peak point voltage of the unijunction transistor Q1, the emitter junction of Q1 conducts, thereby discharging CT into resistor R2', causing a positive pulse to be delivered at A. The elapsed time between the closing of S1 and the appearance of the pulse at A is given approximately by $$T \approx RT \times CT \times \ln(1/(1-\eta))$$

where
$T$ is time in seconds,
$RT$ is timing resistance in ohms,
$CT$ is timing capacitance in farads, and
$\eta$ is the intrinsic standoff ratio, approximately equal to 0.65
Therefore, since $\ln(1/(1-0.65)) \approx 1$, $$T \approx RT \times CT$$

Assuming S1 remains closed after the first output pulse at A, CT will again be charged through $RT$ and after time $T$, again, another pulse will be produced at A. This oscillation will persist as long as S1 and S2 are closed. The frequency of oscillation for a period of $T$ seconds is $$f = 1/T$$

where $f$ is frequency in cycles per second.

If $CT$ is made constant and $RT$ is made inversely proportional to a given worker's hourly rate, then the output pulse frequency at A will be proportional to the worker's hourly rate. Further, if the pulses at A are totalized for the time that the worker was "plugged in," the total displayed will be proportional to the accumulated cost, that is, rate multiplied by time. From the basic relationships, $T = RT \times CT$ and $f = 1/T$, $$RT = 1/(f \times CT)$$

where $f$ = cycles per second (pulses per second), or
$f$ = pulses per hour/3,600 seconds per hour
The numerator, pulses per hour, is the rate in cents per hour. Therefore, $$RT = \frac{3600}{CT \times \text{rate in cents per hour}}$$

or $$RT = \frac{36}{CT \times \text{rate in dollars per hour}}$$

If we arbitrarily set $CT = 100$ microfarads $(100 \times 10^-)$ and solve the above equation for $RT$, we have $$RT = \frac{360,000}{\text{Rate in dollars per hour}}$$

For multiple inputs (more than one worker), each additional resistor, separately determined from the above $RT$ equation, is connected in parallel with the other resistors. The resultant output frequency must then be the sum of the frequencies for the individual resistors. This can be shown from the general frequency equation as follows:

$$f = 1/(RT \times CT)$$

Assume that three individual timing resistors, RT1, RT2, and RT3, are connected in parallel in the circuit. The frequencies, $f_1$, $f_2$, and $f_3$ of the respective resistors, RT1, RT2, and RT3, should total to yield a frequency $f_T$. By adding the frequencies, we have $$f_T = \frac{1}{RT1 \times CT} + \frac{1}{RT2 \times CT} + \frac{1}{RT3 \times CT}$$
$$= \frac{(RT1 \times RT2) + (RT1 \times RT3) + (RT2 \times RT3)}{RT1 \times RT2 \times RT3 \times CT}$$

The calculation of $f_T$ from the original equation $f = 1/(RT \times CT)$ by substituting RT1, RT2, and RT3, in parallel for $RT$, is $$f_T = \frac{1}{\frac{1}{\frac{1}{RT1} + \frac{1}{RT2} + \frac{1}{RT3}} CT}$$

$$= \frac{1}{\frac{RT1 \times RT2 \times RT3}{(RT1 \times RT2) + (RT1 \times RT3) + (RT2 \times RT3)} CT}$$

$$= \frac{(RT1 \times RT2) + (RT1 \times RT3) + (RT2 \times RT3)}{RT1 \times RT2 \times RT3 \times CT}$$

Therefore, $f_T = f_1 + f_2 + f_3 + f_4 + \ldots f_N$.

Figure 1:
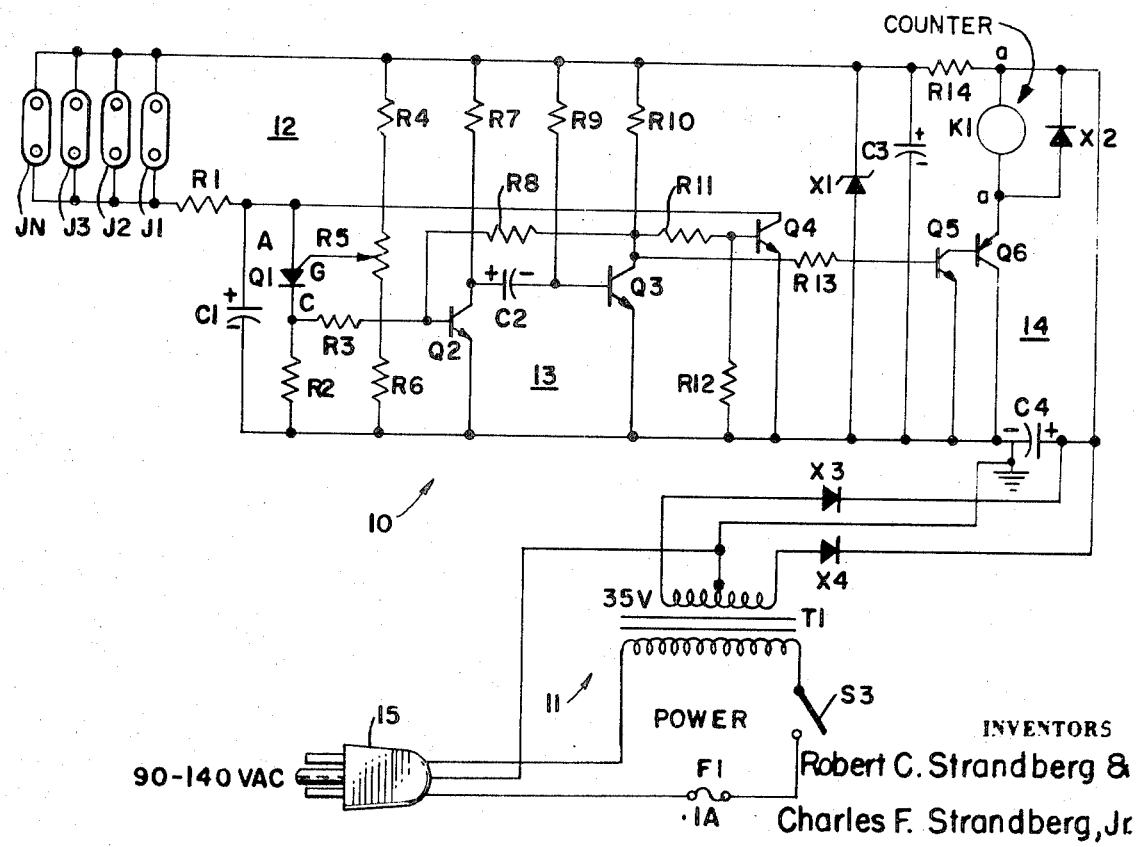
FIG. 1 is a schematic wiring diagram of the invention.

While the resistance-controlled oscillator 12 shown in FIG. 1 is the preferred oscillator for use with the invention, other resistance-controlled oscillators can be used such as the unijunction transistor oscillator 12' shown in FIG. 2 and others which will be apparent to those skilled in the art. The term oscillator as used herein and in the accompanying claims shall be defined as an alternating current or pulse-generating device without mechanically moving parts, the output frequency of which is determined by the characteristics of the device.

The invention is particularly adapted for use in so-called job costing which is a matter of measuring the material and labor that go into a particular part or assembly of parts. In job shops, it can be the total cost of labor which goes into a particular job for a particular customer no matter what the cost of the individual parts and assemblies.

The same concepts apply in any business which sells a service, whether materials are involved or not. A law office or an accounting office would need to know the total labor cost going into a particular job.

As an example of use, the cost-accounting device 10 having 20 resistor plug-receiving receptacles, J1–J20 is installed in a machine shop having a capacity for 20 workers assigned to one job. The cost accumulator will have one dollars-and-cents counter K1 and a space for a job card. Each worker will be given a plug that has been set to his rate of pay. Although the machine has a capacity for 20 workers the job at one time frequently only one to four workers will be plugged into the machine at one time. The number of workers plugged into the machine will vary as the job progresses. A machinist earning $2.75 per hour may begin a shearing operation. Before he has finished his work a punch press operator may be assigned to the same job. His rate may be $2.00 per hour. Before he has finished a third operator may begin picking up the parts for cleaning. As the workers plug in and out of the cost accumulator 10 the counter K1 will accumulate the direct labor cost.

If a particular job is stopped in progress its cost card will be removed and a subtotal will be written in. The counter can then be reset to zero and made ready for another job.

It is contemplated that overtime rates can be handled by assigning to the workers separate overtime plugs which are programmed in accordance with overtime rates. The overtime plugs would be identified by painting or other indicia to distinguish from the regular pay rate plugs.

It is further contemplated that an overtime switch can be provided on each counter, but this could only be used if all workers go on overtime at the same time.

Figure 3:
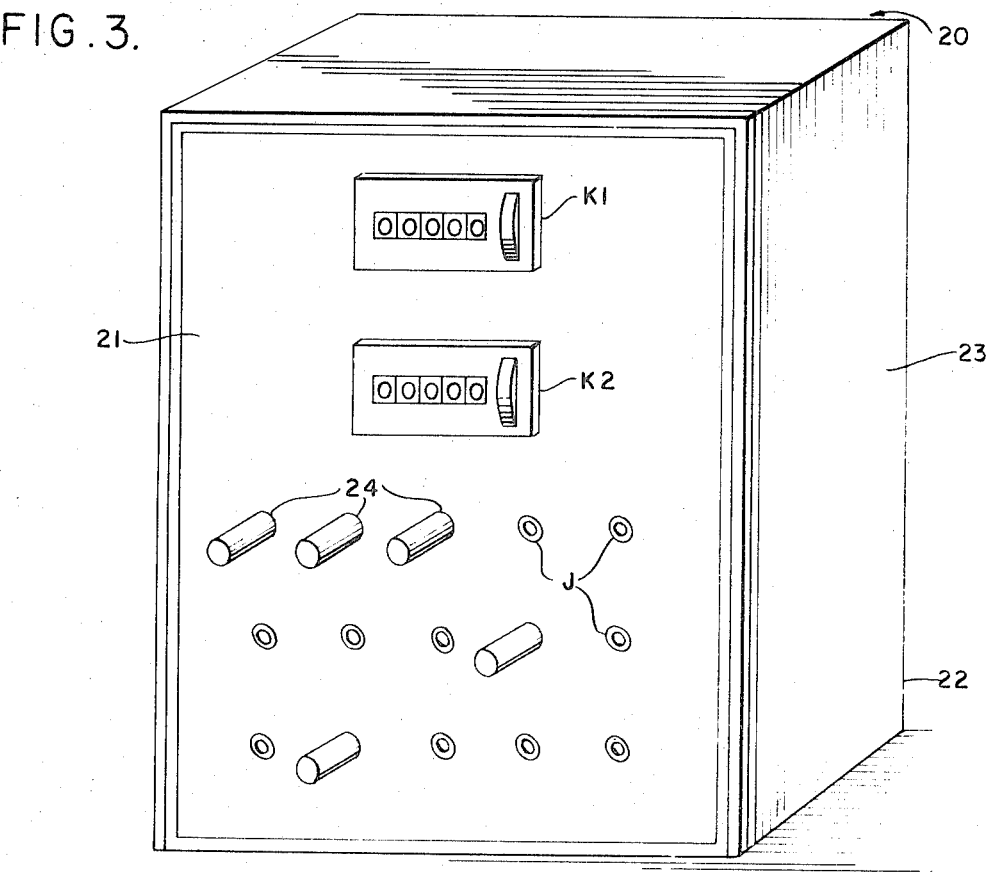
FIG. 3 is a perspective view of the cost accumulator construction showing rate programmed plugs in place.

A typical housing 20 for the cost accumulator of this invention is shown in FIG. 3. The housing is shown to be a boxlike enclosure having a front panel 21, a back 22 and sidewalls 23. Mounted in the front panel 21 are a pair of similar resettable counters K1 and K2 and multiple jacks J into which are inserted a number of individual worker's rate programmed plugs 24 according to the number of workers on the job at a particular time. Enclosed within the housing 20 are the circuit elements shown in FIG. 1. Whereas only one counter K1 is shown in FIG. 1; FIG. 3 shows a second counter K2. The solenoid for the second counter K2 is connected in parallel to the first counter K1 in the circuit shown in FIG. 1 at the junctions $a$—$a$. The two counters K1 and K2 are resettable and actuated simultaneously. The reason for including the second counter as shown in FIG. 3 is to enable the total payroll for a given period to be verified with the counters. For example during a payroll period, the upper counter K1 can be reset several times as jobs are completed and new ones are begun. The lower counter K2 on the other hand is reset only at the end of the payroll period, at which time the sum of all the lower counter totals should equal the payroll. The lower counter may be considered as a verification counter. It is to be understood that one or more counters can be connected in parallel across the junctions $a$—$a$ in FIG. 1 without the scope of this invention.

Figure 4:
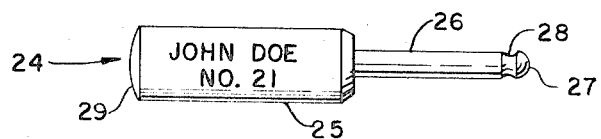
FIG. 4 is an elevational view of a rate programmed plug.

A typical rate-programmed plug 24 as shown in FIG. 4 comprises a hollow cylindrical insulating casing 25, a cylindrical conductive shell 26 and a conductive tip 27 separated from the shell 26 by an insulated strip in the manner of a conventional microphone plug. FIG. 5 is a circuit diagram of the rate-programmed plug 24 which includes a precision potentiometer 30 and a fixed precision resistor 31 connected in series between the shell 26 and the tip 27. In use the value of the resistor 31 is selected to be as near as possible to the resistance required to correspond with a particular worker's pay rate. Since it is not possible to always obtain a fixed resistor which is of a value corresponding precisely to the worker's pay rate scale the precision potentiometer 30 is included in the circuit so that the series resistance of the potentiometer 30 and fixed resistance 31 can be made equal to the resistance required to correspond to the worker's pay rate. After the potentiometer 30 is set, the casing 25 is closed and sealed with an end plug 29 so that the worker to whom the plug is assigned does not have access to the circuit components which he might be tempted to alter to his advantage.

Initial calibration of the oscillator 12 is done by inserting a standard rate-programmed plug into one of the jacks J and adjusting the potentiometer R5 until the oscillator 12 oscillates at the frequency required to cause the counter K1 to indicate a pay rate corresponding to the pay rate for which the standard rate-programmed plug is set. The standard rate-programmed plug is like the plug 24 and has a precise resistance value corresponding to a selected pay rate. After the oscillator 12 has been initially calibrated by adjusting the potentiometer R5, the potentiometer R5 is not adjusted further, and the adjustment of the frequency of the oscillator 12 is thereafter made solely by inserting and/or removing worker's rate-programmed plugs into the jacks J.

The preferred programmable unijunction transistor Q1 used in oscillator 12 is one manufactured by General Electric Company bearing the identifying code D13T2. The transistors Q2, Q3, Q4, and Q5 may be similar transistors of the type 2N3704; and transistor Q6 may be of the type 2N4918. While the transistors Q1 through Q6 have been identified as specific types, other equivalent transistors can be used in their stead within the scope of this invention.

While in the foregoing there has been shown and described the preferred embodiment of the invention, various modifications may become apparent to those skilled in the art to which the invention relates. Accordingly it is not desired to limit the invention to this disclosure, and various modifications and equivalents may be resorted to, falling within the spirit and scope of the invention as claimed.

What is claimed is:

1. A cost accumulator for computing and totalizing over a period of time on job costs for any number of paid workers, comprising a variable-frequency oscillator for producing output pulses at an instantaneous rate proportional to the combined pay rate of all the workers on the job at a given instant and totalizing means for counting the output pulses from said oscillator over a period of time and for indicating the total count at any instant during said time period, said oscillator having a resistance-capacitance timing network for determining the oscillating frequency of said oscillator, said timing network including means for varying the resistance of said network as workers go on or off the job, said resistance-varying means including a plug-in resistor for each worker on the job which is proportional to the individual worker's pay rate, and multiple parallel-connected receptacles in said timing network for receiving said plug-in resistors in parallel connection as workers go on a job, there being received in said receptacles at any instant only as many plug-in resistors as there are workers performing their job at the given instant.

2. The apparatus set forth in claim 1 wherein said oscillator is a programmable unijunction transistor oscillator.

3. The apparatus set forth in claim 1 wherein said totalizing means includes a digital counter.

4. The apparatus set forth in claim 3 wherein said digital counter has digital visual display means for visually indicating said total count in terms of monetary values.

5. The apparatus set forth in claim 1 wherein said totalizing means includes a pair of resettable and simultaneously activated counters.

6. The apparatus set forth in claim 1 wherein said plug-in resistors include a fixed resistance and an adjustable calibrating resistor connected in series.

7. The cost accumulator for computing and totalizing over a period of time on job costs for any number of workers on the job whose rates vary, comprising an adjustable frequency oscillator, and totalizing means for counting the output pulses from said oscillator over a period of time and for progressively indicating the total count as the count is accumulated during said time period, said oscillator having a resistance-capacitance timing circuit for determining the oscillating frequency of said oscillator, and adjustable resistance means in said resistance-capacitance timing circuit to adjust the instantaneous frequency of said oscillator in proportion to the combined pay rate of all workers on the job at a given instant, said adjustable resistance means comprising a resistor for each worker on the job adjusted as a function of the worker's pay rate, and means for connecting all the resistances of the workers on the job at a given instant in parallel into said timing circuit, and said oscillator being a programmable unijunction transistor oscillator which includes a programmable unijunction transistor having means for varying the intrinsic standoff ratio of the transistor to provide initial calibration of said oscillator.

8. A cost accumulator for computing and totalizing over a period of time on job costs for any number of workers on the job whose pay rates vary, comprising an adjustable frequency oscillator, and totalizing means for counting the output pulses from said oscillator over a period of time and for progressively indicating the total count as the count is accumulated during said time period, said oscillator having a resistance-capacitance timing circuit for determining the oscillating frequency of said oscillator, and adjustable resistance means in said resistance-capacitance timing circuit to adjust the instantaneous frequency of said oscillator in proportion to the combined pay rate of all workers on the job at a given instant, the pulse width of pulses produced by said oscillator being narrow compared with the pulse width requirements for reliable operation of said totalizing means, and pulse stretching means interposed between said oscillator and said totalizing means to stretch the pulse width of pulses derived from said oscillator and being counted by said totalizing means to insure reliable operation of said totalizing means, said pulse stretching means being a monostable multivibrator.

9. A cost accumulator for computing and totalizing over a period of time on job costs for a number of workers on the job whose pay rates vary comprising a variable-frequency oscillator having a resistance-capacitance timing network for determining the oscillating frequency of said oscillator, means for initially calibrating said oscillator to a predetermined frequency corresponding to a selected pay rate, a plurality of parallel-connected jacks in said timing circuit, a plurality of rate-programmed resistance plugs for insertion by workers on the job into said jacks and removable by said workers from said jacks when they leave the job, each of said rate programmed resistance plugs being calibrated in accordance with a particular worker's pay rate, and when inserted in said timing circuit said rate-programmed plugs varying the instantaneous frequency of said oscillator in proportion to the combined pay rate of all workers whose plugs are inserted in the jacks at a given instant means for delivering output pulses from said oscillator, and totalizing means for counting said output pulses.

10. The apparatus set forth in claim 9 together with a housing having a front display panel and means mounting said jacks in said front display panel for reception of said rate-programmed plugs.

11. The apparatus set forth in claim 10 wherein said totalizing means comprises at least one resettable digital counter mounted in said display panel of said housing.

* * * * *